June 24, 1930.  M. P. VUKOSAV  1,766,163
AUXILIARY DRIVE FOR ELECTRIC TRUCKS
Filed Nov. 10, 1928
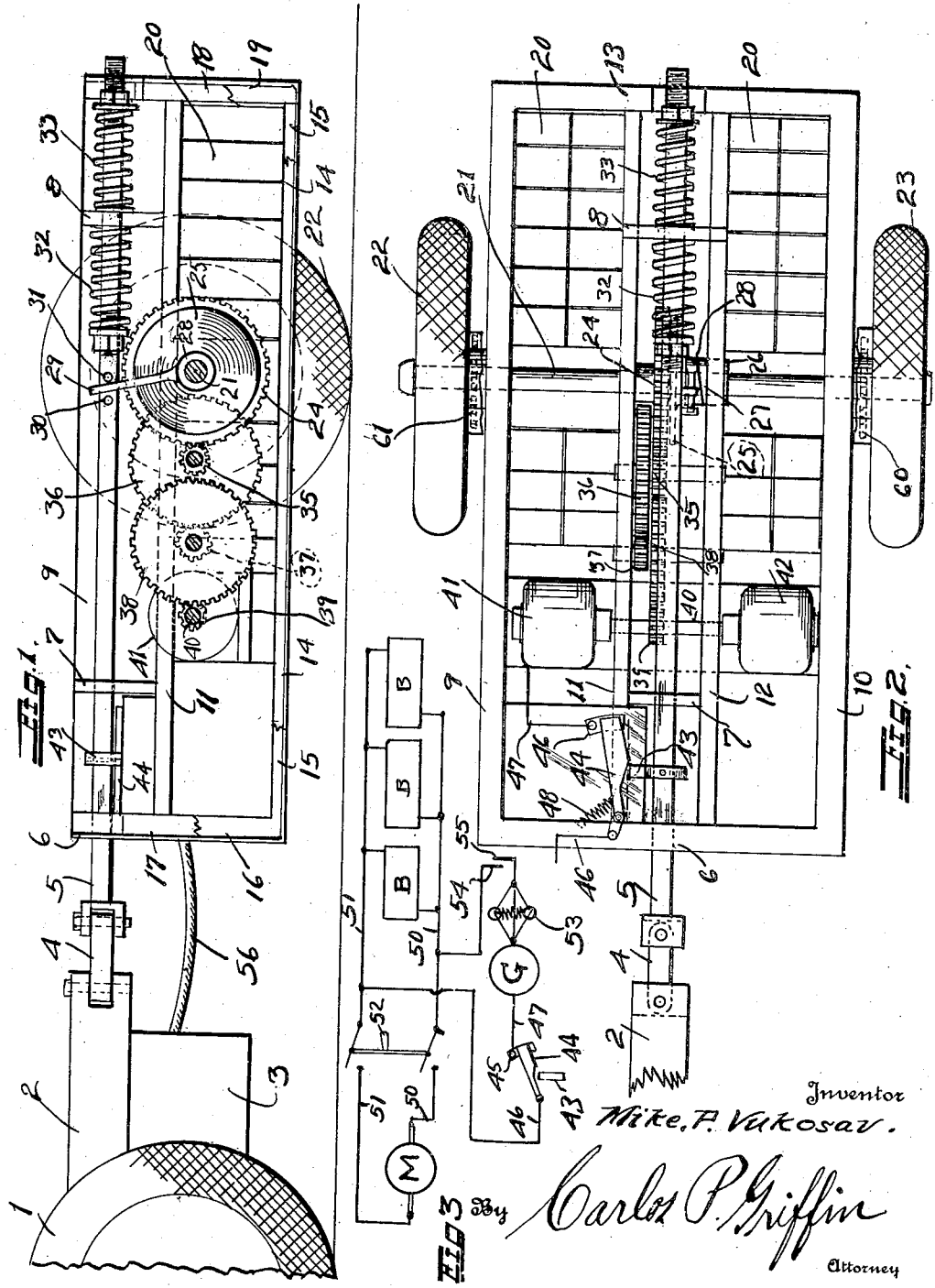
Inventor
Mike. P. Vukosav.
By Carlos P. Griffin
Attorney Patented June 24, 1930

1,766,163

UNITED STATES PATENT OFFICE

MIKE P. VUKOSAV, OF SAN FRANCISCO, CALIFORNIA

AUXILIARY DRIVE FOR ELECTRIC TRUCKS

Application filed November 10, 1928. Serial No. 318,415.

This invention relates to an auxiliary drive for electric trucks, and its object is to provide means whereby a trailer will be connected to an electric generator in such a way as to enable the trailer to store electric energy whenever the brakes would be normally applied to it. This generator is of a sufficiently high voltage to charge all of the batteries carried thereby, while they are at the same time connected on the line and can be used to drive the motor of the truck whenever necessary.

Another object of the invention is to provide means whereby the batteries will be cut out whenever the trailer stops, thereby providing against the back electromotive force from the batteries from injuring the generator in any way.

Another object of the invention is to provide for disconnecting the generator and disconnecting its circuit whenever the draw bar pull on the trailer is positive, the generator being started and the circuit made whenever the trailer has a tendency to run down hill onto the truck to which it is connected.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a side elevation partly diagrammatic of the rear end of the truck, and a sectional view through the trailer showing the relation of its driving gears and generator armature.

Figure 2 is a plan view of the trailer and the bar by which it is attached to the truck, and Figure 3 is a diagrammatic view of the electrical connections necessary.

The numeral 1 indicates the wheel of the truck, 2 a portion of the frame of the truck, and 3 a portion of the box in which the batteries are usually installed.

A short connecting link 4 connects the truck at its rear end with the draw bar 5 which extends through the trailer, said draw bar being held in a given position by means of the frame 6, a fixed plate 7 and the fixed plate 8 through which the draw bar extends. The frame 6 extends to the cross members 9 and 10, and at the center there are additional longitudinal members 11 and 12 which extend from the frame member 6 to the rear frame member 13. There are also the lower longitudinally extending frame members 14 and 15 which are connected at front and rear to the upper frame members 6 and 9 to 13 inclusive by the four vertical members 16 and 17, and 18 and 19, the object being to provide a space within which to place the batteries 20, the batteries being in sets of a convenient voltage as is well known in the art.

Mounted on the axle 21 of the trailer, which is supported by the wheels 22, 23 is a gear 24 at the side of which is a friction disk 25. Attached to the underside of the frame member 12 is a heavy collar 26 with a cam face 27 which may be engaged by an oppositely placed cam face of the movable collar 28, said collar 28 having an operating lever 29. The operating lever 29 extends upwardly and passes between two pins 30, 31 on the draw bar 5, said draw bar being held in the neutral position by means of the two heavy springs 32, 33 normally.

The gear 24 is thus driven by the aid of the friction disk 25 whenever the springs 32, 33 are in their normal position, or whenever the trailer is driving down hill with a tendency to push on its connecting link with the truck.

The gear 24 is in mesh with a small gear 35 which is rigidly connected to a larger gear 36 which gear drives the small gear 37, and which small gear is in turn rigidly connected to a gear 38 which gear drives the small gear 39 which operates the shaft 40, said shaft carrying an armature in each of the fields 41, 42.

The draw bar 5 carries an arm 43 which acts on a cam faced lever 44 to cause it to engage the contact 45 whenever there is no pull on the draw bar, or whenever the trailer is running down hill against the truck. This lever is connected at one end to one of the contact wires 46, and the contact 45 is connected to another contact wire 47 which extends to the generator wiring. A spring 48 is used to push the arm 44 downwardly at all times.

The wire system is indicated at Figure 3 and consists of the motor M which hauls the truck and which has the cables 50, 51 extending to the batteries B and controlled by means of the double pole hand switch 52. The wire 46 extending from the arm 44 connects one of the battery cables 51, while the wire 47 passes to one of the generators which has a governor 53 which opens or closes the contact points 54, 55 in accordance with the requirements of the delivery of current to the battery from the generators.

As illustrated in Figure 3 the generator and motor are both stopped, the points 54, 55 are open even though the lever 44 is closed on the contact 45. As soon as the generator operates, the points 54, 55 will be closed, and current can be turned to the batteries B to charge them. A cable 56 connects the electric system of the trailer with the electric system of the truck to enable all of the batteries to supply the motor with power.

It is of course contemplated that all of the batteries shall be separately charged whenever the truck and trailer are in their garage or place of storage, but that whenever the truck is hauling its trailer that the trailer will be able to charge the batteries whenever the truck and trailer are going down hill, or whenever for any reason the tendency of the trailer is to run forward on the truck, the effort being ordinarily taken up in some form of trailer brake, the present apparatus being intended for the purpose of avoiding the use of a trailer brake, and to collect whatever power is possible to collect from the trailer due to down hill travel.

Any form of pawl 60, 61 may be used to permit the trailer to drive the axle 21 and turn around corners without sliding the wheels.

Having thus described my invention, what I desire to secure by Letters Patent of the United States is as follows, but modifications may be made in carrying out the invention as shown in the drawings and in the above particularly described form thereof, within the purview of the annexed claims.

1. An auxiliary drive for trailer trucks adapted to be drawn by electric storage battery vehicle, a slidable drawbar in said trailer, a link connecting said bar to the vehicle, springs to hold said drawbar against forward or backward movement, a pair of wheels mounted on an axle in said trailer, a clutch on said axle, a chain of gears connecting said clutch and an electric generator, storage batteries connected to said generator, means to operate said clutch by the backward movement of said bar, and means to release the clutch on the forward movement of the bar whereby the chain of gears is operated to drive the generator to charge said storage batteries and act as a brake on said trailer.

2. An auxiliary drive for electric trucks comprising a trailer truck having a pair of wheels, an axle for said wheels, a train of gears adapted to drive an electric generator, a clutch on said axle adapted to connect said train of gears to said axle, storage batteries on said truck connected to said generator, a drawbar mounted on said trailer and connected to said electric truck, means on said drawbar to throw in said clutch on the rearward movement of said bar, whereby said wheels will drive the generator to charge said battery, thus acting as a brake on the trailer, means to release the clutch, and means of using the stored electricity to assist in the driving of the electric truck.

In testimony whereof I have hereunto set my hand this 2nd day of November, A. D. 1928.

MIKE P. VUKOSAV.